(12) United States Patent
Miyauchi

(10) Patent No.: US 9,201,503 B2
(45) Date of Patent: Dec. 1, 2015

(54) USER INTERFACE DEVICE, IMAGE FORMING APPARATUS, USER INTERFACE CONTROL METHOD, AND COMPUTER PROGRAM PRODUCT

(75) Inventor: Kunihiro Miyauchi, Kanagawa (JP)

(73) Assignee: RICOH COMPANY, LIMITED, Tokyo (JP)

(*) Notice: Subject to any disclaimer, the term of this patent is extended or adjusted under 35 U.S.C. 154(b) by 997 days.

(21) Appl. No.: 13/337,750

(22) Filed: Dec. 27, 2011

(65) Prior Publication Data

US 2012/0173973 A1   Jul. 5, 2012

(30) Foreign Application Priority Data

Dec. 29, 2010 (JP) ................................. 2010-294578
Dec. 16, 2011 (JP) ................................. 2011-276332

(51) Int. Cl.
*G09B 21/00* (2006.01)
*G06F 3/01* (2006.01)
*G06F 3/0488* (2013.01)

(52) U.S. Cl.
CPC ............ *G06F 3/016* (2013.01); *G06F 3/04883* (2013.01); *G09B 21/003* (2013.01); *G06F 2203/04808* (2013.01)

(58) Field of Classification Search
CPC ..... G06F 1/1692; G06F 3/0416; G06F 3/016; G06F 1/692; G06F 2203/04808; G09B 21/003
See application file for complete search history.

(56) References Cited

U.S. PATENT DOCUMENTS

| | | | | |
|---|---|---|---|---|
| 5,412,189 | A  * | 5/1995 | Cragun ......................... | 235/379 |
| 5,580,251 | A  * | 12/1996 | Gilkes et al. .................. | 434/113 |
| 8,451,240 | B2 * | 5/2013 | Pasquero et al. .............. | 345/173 |
| 8,494,507 | B1 * | 7/2013 | Tedesco et al. ............... | 455/418 |
| 8,633,907 | B2 * | 1/2014 | Mahalingam ................. | 345/173 |
| 2003/0022701 | A1* | 1/2003 | Gupta ........................... | 455/566 |
| 2003/0071859 | A1* | 4/2003 | Takami et al. ................ | 345/865 |
| 2004/0090448 | A1* | 5/2004 | Litwiller ....................... | 345/702 |
| 2004/0141016 | A1* | 7/2004 | Fukatsu et al. ................ | 345/856 |
| 2004/0239617 | A1* | 12/2004 | Hardwick ..................... | 345/156 |
| 2005/0032026 | A1* | 2/2005 | Donahue ....................... | 434/113 |
| 2006/0024647 | A1* | 2/2006 | Chesnais et al. .............. | 434/114 |
| 2006/0164387 | A1* | 7/2006 | Takisima ...................... | 345/156 |
| 2006/0261983 | A1* | 11/2006 | Griffin et al. .................. | 341/27 |

(Continued)

FOREIGN PATENT DOCUMENTS

| | | |
|---|---|---|
| JP | 2003-76475 | 3/2003 |
| JP | 3890308 | 12/2006 |

*Primary Examiner* — Shen Shiau
(74) *Attorney, Agent, or Firm* — Oblon, McClelland, Maier & Neustadt, L.L.P.

(57) ABSTRACT

A user interface device includes a display panel; a display-panel control unit that displays, at appropriate locations on the display panel, various types of display information and function buttons to which functions are allotted; an operation-location detecting unit that detects a user's operation performed in contact with or close to a surface of the display panel so as to acquire an operation location; a feedback output unit that outputs predetermined feedback that gives a touch sensation to a user; a determining unit that determines whether the operation location is a display location of the function button displayed on the display panel; and a control unit that, when the determining unit determines that the operation location is the display location of the function button, causes the feedback output unit to output predetermined feedback that is associated with the function button.

11 Claims, 10 Drawing Sheets

(56) References Cited

U.S. PATENT DOCUMENTS

| | | | |
|---|---|---|---|
| 2007/0190500 A1* | 8/2007 | Uemitsu et al. | 434/113 |
| 2007/0229233 A1* | 10/2007 | Dort | 340/407.1 |
| 2008/0024459 A1* | 1/2008 | Poupyrev et al. | 345/173 |
| 2008/0243624 A1* | 10/2008 | Perry et al. | 705/15 |
| 2009/0220923 A1* | 9/2009 | Smith et al. | 434/113 |
| 2010/0023857 A1* | 1/2010 | Mahesh et al. | 715/701 |
| 2010/0055651 A1* | 3/2010 | Rantala et al. | 434/114 |
| 2010/0134416 A1* | 6/2010 | Karasin et al. | 345/163 |
| 2010/0138031 A1* | 6/2010 | Werfeli et al. | 700/200 |
| 2010/0225456 A1* | 9/2010 | Eldering | 340/407.2 |
| 2010/0328231 A1* | 12/2010 | Pasquero et al. | 345/173 |
| 2010/0330540 A1* | 12/2010 | Munn | 434/113 |
| 2011/0012716 A1* | 1/2011 | Miller, IV | 340/407.2 |
| 2011/0025602 A1* | 2/2011 | Sivan et al. | 345/156 |
| 2011/0043077 A1* | 2/2011 | Yeh et al. | 310/338 |
| 2011/0143321 A1* | 6/2011 | Tran et al. | 434/114 |
| 2011/0179388 A1* | 7/2011 | Fleizach et al. | 715/840 |
| 2011/0184824 A1* | 7/2011 | George et al. | 705/24 |
| 2011/0210834 A1* | 9/2011 | Pasquero et al. | 340/407.1 |
| 2011/0210926 A1* | 9/2011 | Pasquero et al. | 345/173 |
| 2011/0254670 A1* | 10/2011 | Han et al. | 340/407.1 |
| 2011/0287393 A1* | 11/2011 | Rebolledo-Mendez | 434/113 |
| 2011/0304558 A1* | 12/2011 | Pasquero et al. | 345/173 |
| 2011/0310041 A1* | 12/2011 | Williams et al. | 345/173 |
| 2012/0044174 A1* | 2/2012 | Kim | 345/173 |
| 2012/0070805 A1* | 3/2012 | Wong et al. | 434/114 |
| 2012/0123784 A1* | 5/2012 | Baker et al. | 704/270 |
| 2012/0146890 A1* | 6/2012 | Karstens | 345/156 |

* cited by examiner

USER INTERFACE DEVICE, IMAGE FORMING APPARATUS, USER INTERFACE CONTROL METHOD, AND COMPUTER PROGRAM PRODUCT

CROSS-REFERENCE TO RELATED APPLICATIONS

The present application claims priority to and incorporates by reference the entire contents of Japanese Patent Application No. 2010-294578 filed in Japan on Dec. 29, 2010 and Japanese Patent Application No. 2011-276332 filed in Japan on Dec. 16, 2011.

BACKGROUND OF THE INVENTION

1. Field of the Invention

The present invention relates to a user interface device, an image forming apparatus, a user interface control method, and a computer program product.

2. Description of the Related Art

Nowadays, touch-panel display devices are used as user interface devices in image forming apparatuses, such as multifunction peripherals, and electronic information processing apparatuses, such as personal computers, word processors, electronic notebooks, or mobile phones. In order to facilitate input operations, a touch panel is superimposed on the surface of a display panel, the function buttons are displayed on the display panel, and a touch operation is performed on the touch panel at the location corresponding to the displayed function button. Thus, the touch-panel display device enables execution of functions, such as commands assigned to the function buttons, selection of data, or input of characters.

Visually impaired people cannot visually check and operate the function buttons displayed on the display panel of a user interface device that uses the above-described touch-panel display device.

A conventional input device is disclosed that includes a concave-convex display area that displays the same content as that displayed on the display unit in a tactually perceptible manner (for example, see Japanese Patent Application Laid-open No. 2004-265035). Push buttons, which have the same functions as those of the function buttons of the display unit, are located in the surroundings of the display unit.

In the above-described conventional technique, there is the concave-convex display area that displays the same content as that displayed on the display unit in a tactually perceptible manner, and the push buttons, which have the same functions as those of the function buttons of the display unit, are located in the surroundings of the display unit. Therefore, users cannot deal with situations where the function buttons are arranged and displayed on the entire display screen of the display unit or where the display screen is shifted in response to an operation so that the locations of the function buttons are changed. Thus, the convenience for users is decreased. For this reason, there is a need to provide a more functional screen display that enables visually impaired people to correctly and easily recognize the locations and functions of the function buttons.

Therefore, there is a need for a user interface device that enables visually impaired people to correctly and easily recognize the locations and functions of the function buttons without being constrained by the display locations of the function buttons, whereby the convenience for users can be improved.

SUMMARY OF THE INVENTION

In an aspect of this disclosure, there is provided a user interface device that includes a display panel; a display-panel control unit that displays, at appropriate locations on the display panel, various types of display information and function buttons to which functions are allotted; an operation-location detecting unit that detects a user's operation performed in contact with or close to a surface of the display panel so as to acquire an operation location; a feedback output unit that outputs predetermined feedback that provide a tactile sensation to a user; a determining unit that determines whether the operation location is a display location of the function button displayed on the display panel; and a control unit that, when the determining unit determines that the operation location is the display location of the function button, causes the feedback output unit to output predetermined feedback that is associated with the function button.

In an another aspect of this disclosure, there is provided a user interface control method that includes displaying, at appropriate locations on a display panel, various types of display information and function buttons to which functions are allotted; detecting an operation performed in contact with or close to a surface of the display panel so as to acquire an operation location; outputting predetermined feedback that is associated with the operation location in response to an operation performed on the display panel; and determining whether the operation location is a display location of the function button displayed on the display panel and, when the operation location is the display location of the function button, outputting predetermined feedback that is associated with the function button at the outputting.

In a still another aspect of this disclosure, there is provided a computer program product that includes a non-transitory computer-readable medium including computer-readable program codes embodied in the medium for controlling a user interface. The program codes when executed cause a computer to execute displaying, at appropriate locations on a display panel, various types of display information and function buttons to which functions are allotted; detecting an operation performed in contact with or close to a surface of the display panel so as to acquire an operation location; outputting predetermined feedback that is associated with the operation location in response to an operation performed on the display panel; and determining whether the operation location is a display location of the function button displayed on the display panel and, when the operation location is the display location of the function button, outputting predetermined feedback that is associated with the function button at the outputting.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Preferred embodiments of the present invention are explained in detail below with reference to the accompanying drawings. Because the following embodiments are preferred embodiments of the present invention, various limitations, which are preferable in terms of the technology, are made to the embodiments; however, the scope of the present invention is not unduly limited by the following descriptions, and not all of the components described in the embodiments are essential components of the present invention.

Figure 1:
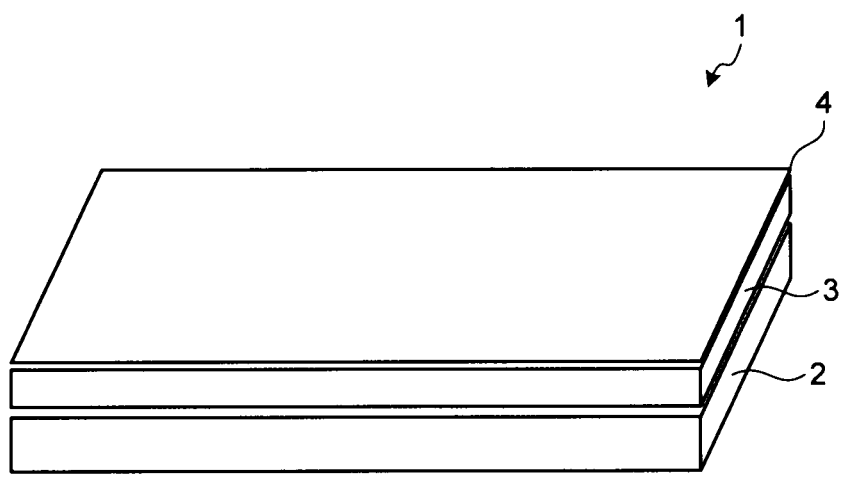
FIG. 1 is a schematic diagram of a user interface device to which the present embodiment is applied.

FIGS. 1 to 13 are diagram that illustrate embodiments of a user interface device, an image forming apparatus, a user interface control method, a user interface control program, and a recording medium according to the present invention. FIG. 1 is a schematic perspective view of a user interface device 1 that uses an embodiment of the user interface device, the image forming apparatus, the user interface control method, the user interface control program, and the recording medium according to the present invention.

As illustrated in FIG. 1, the user interface device 1 is configured such that a feedback panel 3 and a touch panel 4 are sequentially laminated on a display panel 2. The user interface device 1 is used as, for example, an operation display unit of an image forming apparatus, such as a printer, copier, or multifunction peripheral. In the case of an image forming apparatus that forms images, the user interface device 1 is used as an operation display unit on which an input/output operation, such as a setting operation for forming images, is performed.

For example, a liquid crystal display (LCD) is used as the display panel 2. The display panel 2 displays data at a predetermined resolution. The displayed data includes the status of an apparatus that uses the user interface device 1 or various types of information that a user is notified of by the apparatus. For example, if there are multiple operation modes, the operation guide information for each of the operation modes and the function buttons to be operated during the operation mode are displayed at appropriate locations on the entire display panel 2.

The feedback panel 3 is a panel that outputs force feedback (hereafter, simply referred to as "feedback") so as to provide a predetermined tactile feedback to the finger of a user who is touching the surface of the touch panel 4. A piezoelectric element system may be used for the feedback panel 3. The piezoelectric element system is a system in which a large number of piezoelectric elements are arranged on the feedback panel 3 and the piezoelectric elements are vibrated in accordance with the touched coordinate location on the touch panel 4. If a piezoelectric element system is used for the feedback panel 3, the panel and the technique disclosed in, for example, Japanese Patent Application Laid-open No. 2007-086990 can be used. In addition, various systems, such as an electrostatic system, can be used for the feedback panel 3. The feedback panel 3 according to this embodiment may use any system as long as it enables a user to recognize characters, images, or the like, by giving a sensation to the finger that is touching the surface of the touch panel 4.

The touch panel 4 can use various systems, such as a resistive system, electrostatic system, pressure sensor system, image-capturing system, or infrared system. There is no limitation on the system used by the touch panel 4.

Figure 2:
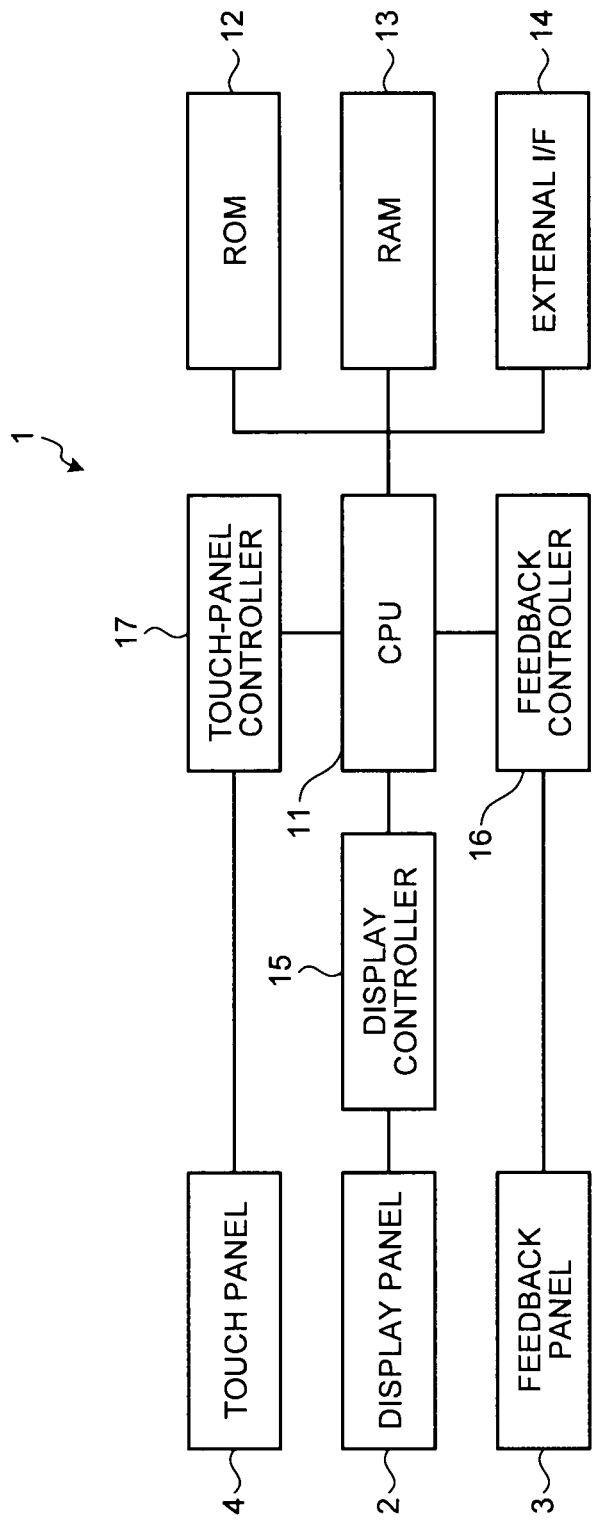
FIG. 2 is a block diagram of a control system of the user interface device.

The control blocks of the user interface device 1 are configured as illustrated in FIG. 2. The user interface device 1 includes the above-described display panel 2, the feedback panel 3, the touch panel 4, a central processing unit (CPU) 11, a read only memory (ROM) 12, a random access memory (RAM) 13, an external I/F 14, a display controller 15, a feedback controller 16, a touch-panel controller 17, and the like.

The ROM 12 stores therein programs, such as the basic program for the user interface device 1 or the user interface control program according to the present invention, and necessary system data. The RAM 13 is used as a working memory for the CPU 11. The external I/F 14 is connected to an apparatus, such as an image forming apparatus that uses the user interface device 1. The external I/F 14 transfers and receives commands and data to and from the apparatus so as to input/output display information, output operation data, or the like.

The CPU 11, which functions as a determining unit 11a and a control unit 11b that will be described later, uses programs stored in the ROM 12; uses the RAM 13 as a working memory; outputs the display information, which is received from the external I/F 14, to the display controller 15; outputs feedback data to the feedback controller 16; or outputs touch-panel data, which is received from the touch-panel controller 17, to the apparatus via the external I/F 14. Specifically, the CPU 11 reads the user interface control program for executing the user interface control method according to the present invention, which is recorded in a recording medium readable by a computer, such as a ROM, electrically erasable and programmable read only memory (EEPROM), EPROM, flash memory, flexible disk, compact disc read only memory (CD-ROM), compact disc rewritable (CD-RW), digital versatile disk (DVD), secure digital (SD) card, or magneto-optical disk (MO). The CPU 11 loads the read program into the ROM 12 so as to be configured as the user interface device 1 that performs the user interface control method that enables visually impaired people to easily recognize and operate the function buttons, which will be described later. The user interface control program is a program that is executable by a computer and is described in a legacy programming language or an object-oriented programming language, such as assembler, C, C++, C#, or Java (registered trademark). This program may be stored in and distributed from the above-described recording medium.

Under the control of the CPU 11, the display controller 15 receives display data from the CPU 11 and causes the display panel 2 to display the display data at a designated location.

The feedback controller 16 receives feedback data from the CPU 11 and, under the control of the CPU 11, outputs the feedback to the location on the feedback panel 3 that is designated by the CPU 11. This feedback is performed by the feedback controller 16 so as to provide Braille to the finger that is touching the touch panel 4 by, for example, electrical stimulation, vibration stimulation, or the like. The above-described feedback panel 3 and the feedback controller 16 collectively function as a feedback output unit.

The touch-panel controller 17 detects a touch operation performed by the finger of a user on the touch panel 4 and outputs the detected coordinate location (operation location) to the CPU 11. The touch-panel controller 17 has a function of detecting touch operations that are simultaneously performed on multiple locations on the touch panel 4, i.e., a multi-touch detecting function. The touch-panel controller 17 outputs the detection result of the multi-touch operation to the CPU 11. The above-described touch panel 4 and the touch-panel controller 17 collectively function as an operation-location detecting unit.

The CPU 11 stores, in the RAM 13, display location data of display data, such as information and function buttons displayed on the display panel 12. The CPU 11 compares the multi-touch display location acquired from the touch-panel controller 17 with the display location data stored in the RAM 13 so as to check the details of a touch operation, for example, to check as to whether a function button has been touched.

Figure 3:
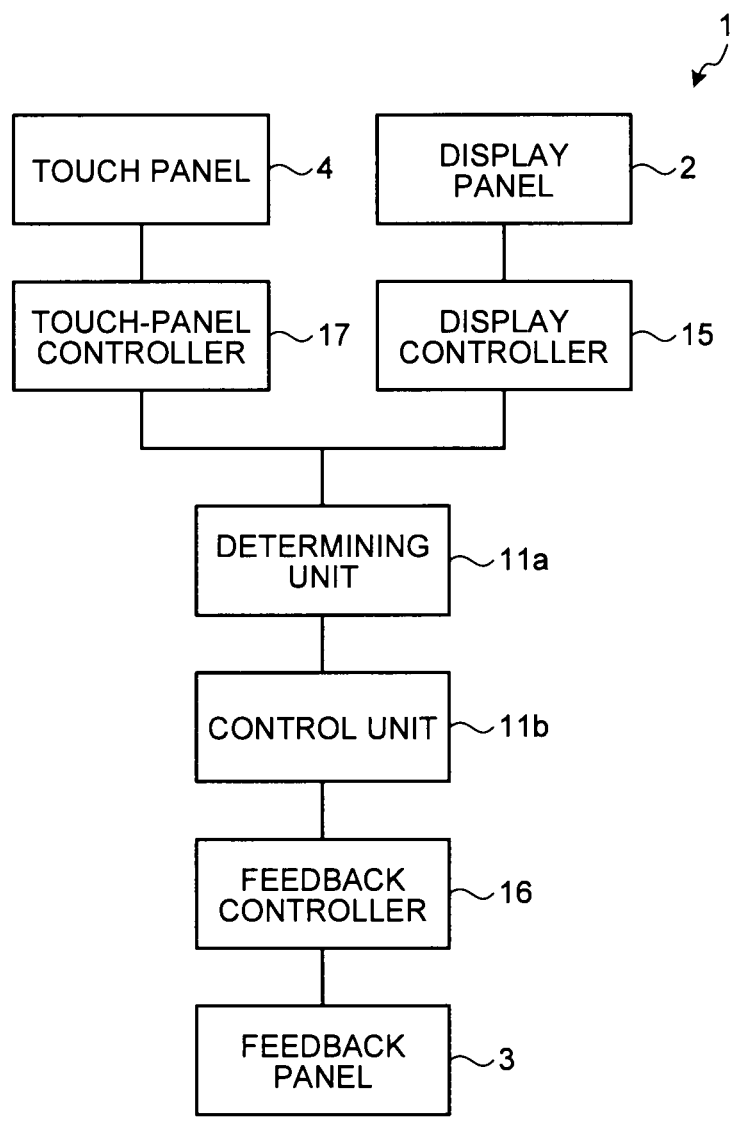
FIG. 3 is a block diagram that illustrates the functional configuration of the user interface device according to the present embodiment.

Next, an explanation is given of the functional configuration of the user interface device 1 according to this embodiment. FIG. 3 is a block diagram that illustrates the functional configuration of the user interface device 1 according to the present embodiment. As illustrated in FIG. 3, the user interface device 1 according to the present embodiment includes the determining unit 11*a* and the control unit 11*b* in addition to the above-described touch panel 4, the touch-panel controller 17, the display panel 2, the display controller 15, the feedback panel 3, and the feedback controller 16.

The determining unit 11*a* and the control unit 11*b* have the modular configuration of the user interface control program stored in the ROM 12. The CPU 11 reads the user interface control program from the ROM 12 and executes the read program so that the determining unit 11*a* and the control unit 11*b* are generated on the RAM 13.

The determining unit 11*a* determines whether the coordinate location (operation location) on which a user's operation has been performed is the display location of the function button displayed on the display panel 2.

More specifically, when multiple operation locations have been detected as the operation location, the determining unit 11*a* determines whether at least one of the operation locations is the display location of the function button. Furthermore, the determining unit 11*a* determines whether all of the operation locations are the display locations of the function buttons. Moreover, the determining unit 11*a* determines whether there is a space on the touch panel 4 onto which the entire symbol and character string can be output in its output direction.

When the determining unit 11*a* determines that the coordinate location (operation location) is the display location of the function button, the control unit 11*b* causes the feedback controller 16 and the feedback panel 3 to output predetermined tactile feedback, which is associated with the function button.

More specifically, when the determining unit 11*a* determines that at least one of the locations of operations performed by the user is the display location of the function button, the control unit 11*b* causes the feedback controller 16 and the feedback panel 3 to output, at the operation location, tactile feedback that allows the user to perceive that the operation location corresponds to the function button and also to output, at another operation location, tactile feedback that allows the user to perceive information indicating the details of the function of the function button.

The tactile feedback that allows the user to perceive that the operation location corresponds to the function button may include, for example, vibration in the area of the function button, which provides a touch sensation to the user such that the user feels as if the user is pressing the function button. The tactile feedback that allows the user to perceive information indicating the details of the function of the function button may include, for example, vibration of the Braille that represents the details of the function of the function button.

When the determining unit 11*a* determines that all of the locations of operations performed by the user are the display locations of the function buttons, the control unit 11*b* causes the feedback controller 16 and the feedback panel 3 to output, at the initially operated operation location, tactile feedback that allows the user to perceive that the operation location corresponds to the function button.

Furthermore, the control unit 11*b* causes the feedback controller 16 and the feedback panel 3 to output, as the information indicating the details of the function of the function button, the symbol and character string that represents the details of the function. The symbol and character string is output in a given output direction, starting from the operation location. When there is no space on the touch panel 4 onto which the entire symbol and character string can be output in the output direction, the control unit 11*b* causes the feedback controller 16 and the feedback panel 3 to output the symbol and character string by changing an output direction of the entire symbol and character string from the given output direction to another output direction in which the entire symbol and character string can be output.

Upon detection of any movement in any direction of the operation location at which the symbol and character string is output to represent the details of the function of the function button, the control unit 11*b* causes the feedback controller 16 and the feedback panel 3 to sequentially output the symbol and character string in accordance with the movement of the operation location.

The control unit 11*b* causes the feedback controller 16 and the feedback panel 3 to delete, according to a predetermined deletion condition, the symbol and character string, which has been sequentially output in accordance with the movement of the operation location. The control unit 11*b* causes the output symbol and character string to be deleted by using, as the above-described deletion condition, the total number of output characters in the symbol and character string, the elapsed time after the symbol and character string is output, or overlapping with other output symbol and character strings on the operation location.

When the operation location moves in a backward direction over the symbol and character string, which has been output in accordance with the movement of the operation location, and reaches at the location from which the symbol and character string has been deleted, the control unit 11*b* causes the feedback controller 16 and the feedback panel 3 to output the deleted symbol and character string again onto the operation location.

In addition, the control unit 11b changes the size of the symbol and character string depending on the size of a space that starts from the operation location at which the symbol and character string start to be output and that extends in a direction along which the symbol and character string is output. Then, the changed symbol and character string is output.

Next, an explanation is given of an effect of the present embodiment. The user interface device 1 according to the preset embodiment correctly outputs the guide information on a function button in response to a touch operation performed on the touch panel 4.

Figure 4:
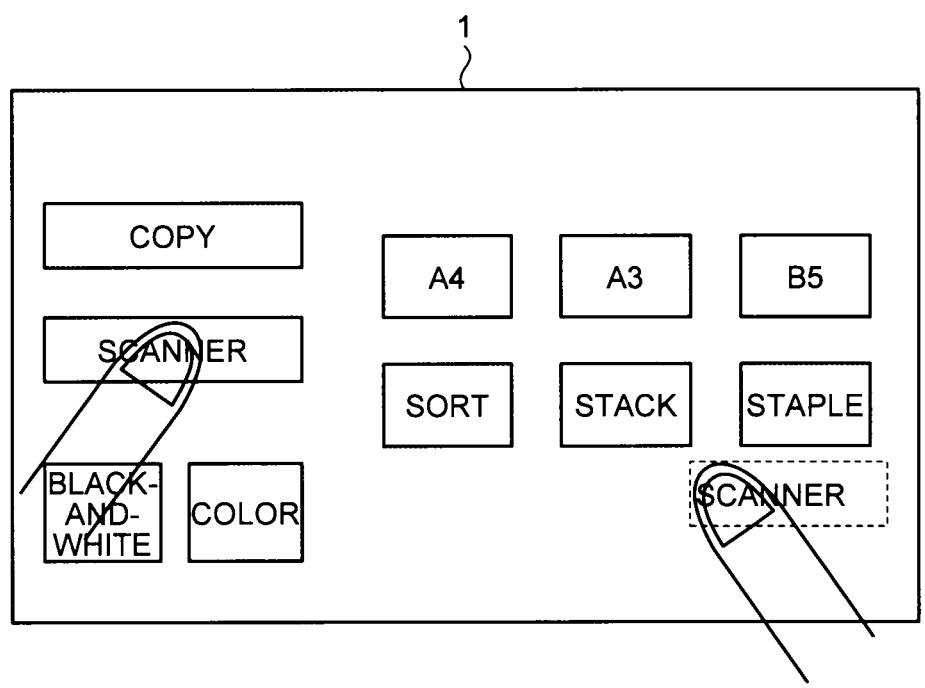
FIG. 4 is a plan view of the user interface device and illustrates an example where a multi-touch operation is being performed.
Figure 5:
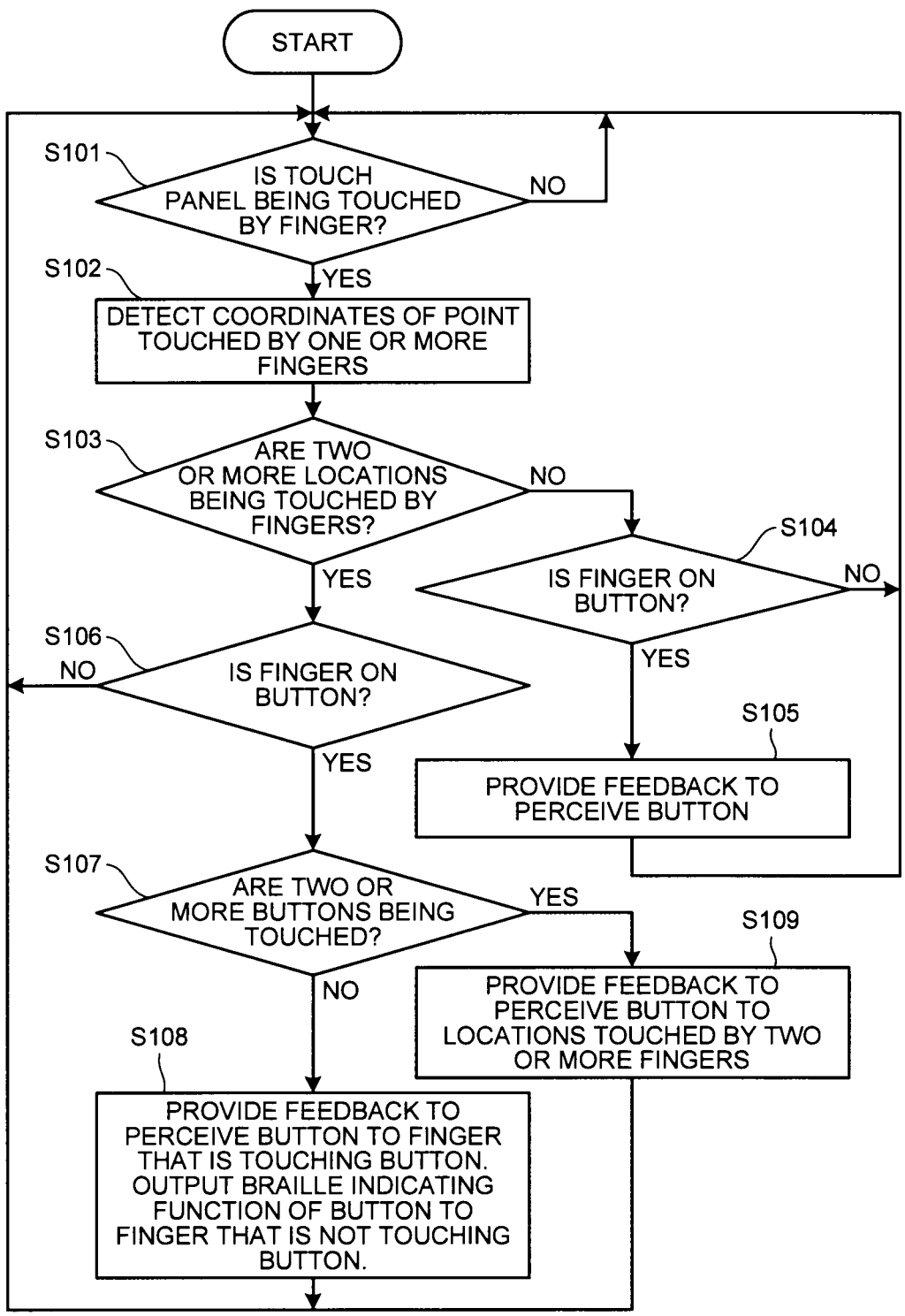
FIG. 5 is a flowchart that illustrates a feedback output control process performed in response to a touch operation.

Specifically, in the user interface device 1, when the CPU 11 causes the display panel 2 to display the function buttons and other display information via the display controller 15, as illustrated in FIG. 4, the control unit 11b (the CPU 11) performs a feedback output process in response to a touch operation, as illustrated in FIG. 5. Specifically, as illustrated in FIG. 5, the determining unit 11a (the CPU 11) acquires the detection result of a touch operation from the touch-panel controller 17 so as to check whether the touch panel 4 is being touched by the finger of a user (whether a touch operation is being performed) (Step S101). When a touch operation is being performed, the coordinates of the point on which the touch operation has been performed and with which one or more fingers are in contact are detected (Step S102).

After the coordinates of the touched location are detected, the determining unit 11a (the CPU 11) determines whether two or more locations are being touched by the fingers (Step S103). When only one location is being touched by a finger, the determining unit 11a checks whether the function button is being touched by the finger (Step S104).

At Step S104, if the function button is not being touched by a finger, the control unit 11b (the CPU 11) does not cause the feedback panel 3 to perform feedback. The process then returns to Step S101, and the above-described process is repeated in the same manner, starting from a check as to whether the touch panel 4 is being touched by a finger (Steps S101 to S104).

At Step S104, when the function button is being touched by a finger, e.g., when the scanner function button is being touched by a finger, as illustrated in FIG. 4, the control unit 11b (the CPU 11) outputs, to the feedback controller 16, feedback data that indicates that the touched location is the location of the function button. The feedback controller 16 then generates, at the location on the feedback panel 3 corresponding to the touched location, feedback that allows the user to perceive that the user is touching the function button (Step S105). Then, the process returns to Step S101.

At Step S103, if two or more locations on the touch panel 4 are being touched by fingers, the determining unit 11a (the CPU 11) checks whether at least one of the function buttons is being touched by a finger, i.e., whether at least one of the touched locations is the location of the function button (Step S106). When the function button is not being touched by any fingers, the feedback panel 3 does not provide feedback. The process then returns to Step S101, and the above-described process is repeated in the same manner, starting from a check as to whether the touch panel 4 is being touched by a finger (Steps S101 to S106).

At Step S106, when at least one of the function buttons is being touched by the finger, the determining unit 11a (the CPU 11) checks whether two or more function buttons are being touched by fingers (Step S107). When only one finger is touching the function button and another finger is touching a location other than that of the function button, the control unit 11b provides, to the finger that is touching the function button, feedback to perceive that the finger is touching the function button, and provides, to another finger, feedback to perceive information indicating the details of the function of the touched function button (Step S108). The process then returns to Step S101. For example, as illustrated in FIG. 4, when one finger is touching the scanner button, which is the function button, and another finger is touching an area of the touch panel 4 other than the function buttons, the control unit 11b (the CPU 11) causes the feedback panel 3, via the feedback controller 16, to generate, at the location on the feedback panel 3 corresponding to the location touched by the one finger, feedback to notify the user that the touched location is the location of the function button. The control unit 11b also causes the feedback panel 3, via the feedback controller 16, to generate, at the location on the feedback panel 3 corresponding to the area touched by another finger, feedback to notify the user of information indicating that the touched function button is the scanner button.

The feedback to notify the user that the touched location is the location of the function button may include, for example, vibration in the area of the function button, which provides a tactile sensation to the user's finger such that the user feels as if the user is pressing the function button.

According to the method of feedback to notify the user of the details of the function of the touched function button, the control unit 11b (the CPU 11) causes, for example, the feedback panel 3 to feedback the symbol and character string, such as Braille (e.g., the Braille for SCANNER in the case illustrated in FIG. 4), that represents the details of the function of the function button.

At Step S107, if two or more fingers are touching the function buttons, the control unit 11b (the CPU 11) provides, via the feedback controller 16, feedback to notify the user that the touched locations are the locations of the function buttons to the locations being touched by two or more fingers (Step S109). The process then returns to Step S101.

When a finger, which is touching the function button on the touch panel 4, moves away from the location of the function button, the determining unit 11a (the CPU 11) determines that the button operation of the function button has been performed. Instead of the determination performed in accordance with the movement of a finger away from the location of the function button, the determination as to whether the button operation of the function button has been performed may be performed in accordance with, for example, a double-touch operation on the function button, or the like.

In the above explanation, when all the fingers, which are touching two or more locations on the touch panel 4, are on the function buttons, feedback is performed to allow the users to perceive that the location touched by each finger corresponds to the function button. The feedback method is not limited to that described above. For example, as illustrated in FIG. 6, when the function button on the touch panel 4 is being touched by one finger while any location is touched by a different finger, feedback of the symbol and character string, such as Braille, is generated to allow the user to perceive information indicating the details of the function of the function button on which the above-described one finger is located, even when the location touched by the different finger is the location of the function button.

Figure 6:
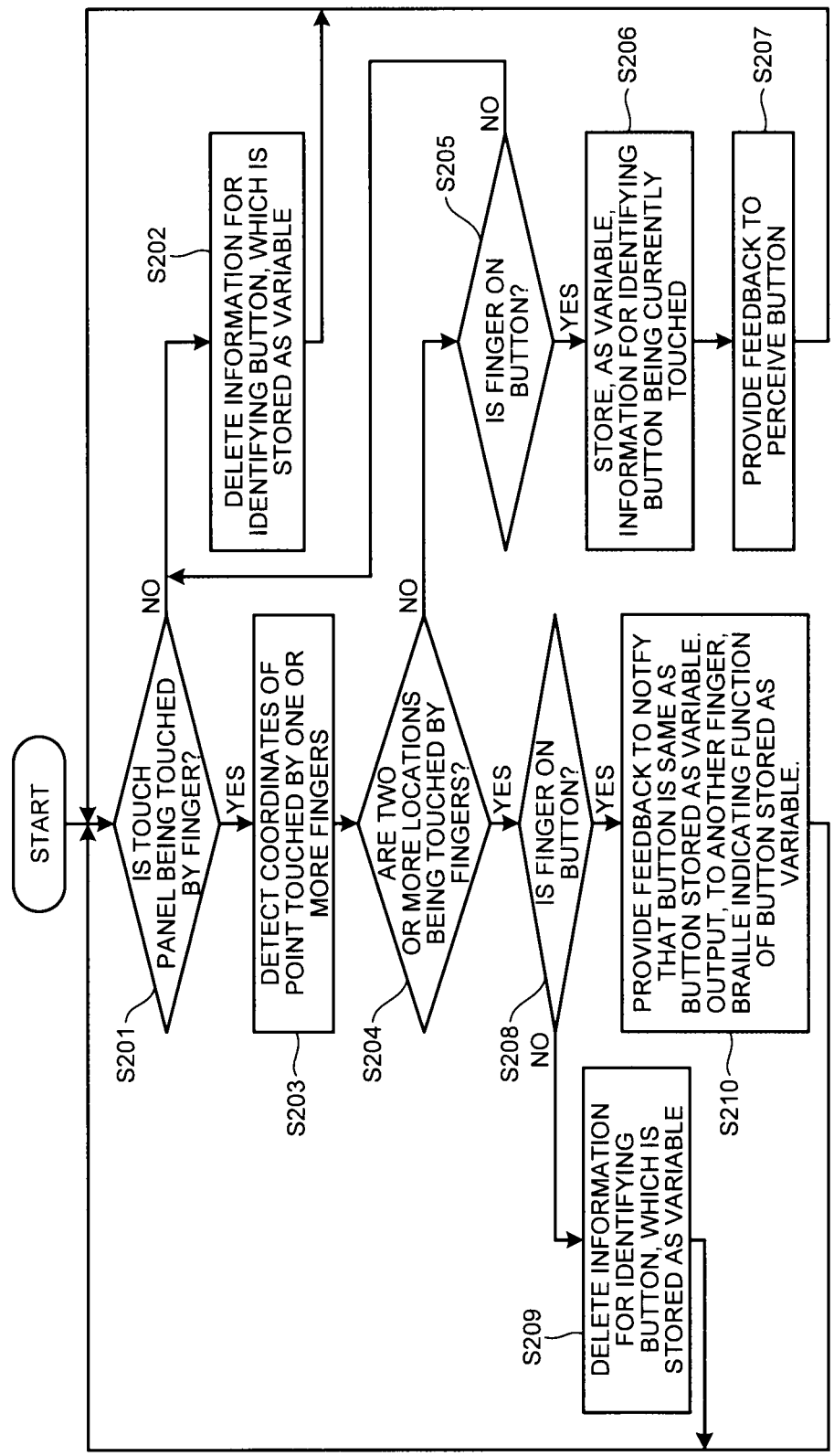
FIG. 6 is a flowchart that illustrates a feedback output control process performed if two or more touched locations correspond to the function buttons.

Specifically, as illustrated in FIG. 6, the determining unit 11a (the CPU 11) checks whether the touch panel 4 is being touched by a finger, i.e., a touch operation is being performed (Step S201). If the touch panel 4 is not being touched by any fingers, the control unit 11*b* (the CPU 11) deletes the information for identifying the function button, which is stored as a variable (stored in a register, or the like) (Step S202). The process then returns to Step S201.

At Step S201, when the touch panel 4 is being touched by a finger, the coordinate location of the point touched by one or more fingers is detected (Step S203). The determining unit 11*a* (the CPU 11) then checks whether two or more locations on the touch panel 4 are being touched by fingers (Step S204).

At Step S204, when only one point on the touch panel 4 is being touched by a finger, the determining unit 11*a* (the CPU 11) checks whether the function button is being touched by the finger (Step S205). If the function button is not being touched by the finger, the control unit 11*b* (the CPU 11) deletes the information for identifying the function button, which is stored as a variable (Step S202). The process then returns to Step S201, and the above-described process is performed in the same manner (Steps S201 to S205).

At Step S205, when the function button is being touched by a finger, the control unit 11*b* (the CPU 11) stores the information for identifying the currently touched function button as a variable (Step S206) and causes feedback to be performed, via the feedback controller 16, to the touched location so as to notify the user that the location corresponds to the function button (Step S207). The process then returns to Step S201.

At Step S204, when two or more locations on the touch panel 4 are being touched by fingers, the determining unit 11*a* (the CPU 11) checks whether the function button is being touched by a finger (Step S208). When the function button is not being touched by a finger, the control unit 11*b* (the CPU 11) deletes the information for identifying the function button, which is stored as a variable (Step S209). The process then returns to Step S201, and the above-described process is performed in the same manner (Steps S201 to S209).

At Step S208, when the function button is being touched by a finger, the control unit 11*b* (the CPU 11) causes the feedback panel 3, via the feedback controller 16, to perform feedback so as to notify the user that the function button is the same as the function button indicated by the identification information stored as a variable. The control unit 11*b* also causes the feedback panel 3, to perform feed back to the location (touched location) touched by another finger, so as to notify the user, by using a symbol and character string, such as Braille, of information indicating the details of the function assigned to the function button indicated by the identification information stored as a variable (Step S210).

Various methods may be used as a method of feedback of the details of the function of the function button in the case of using character information, such as Braille. For example, when Braille is output, the control unit 11*b* (the CPU 11) automatically determines the direction of the string of the Braille, i.e., upward, downward, leftward, or rightward direction, on the basis of the position of the finger placed on the side from which the Braille is output, selects the direction of the string to be output in accordance with the above determination, and causes the feedback panel 3, via the feedback controller 16, to output feedback.

Figure 7:
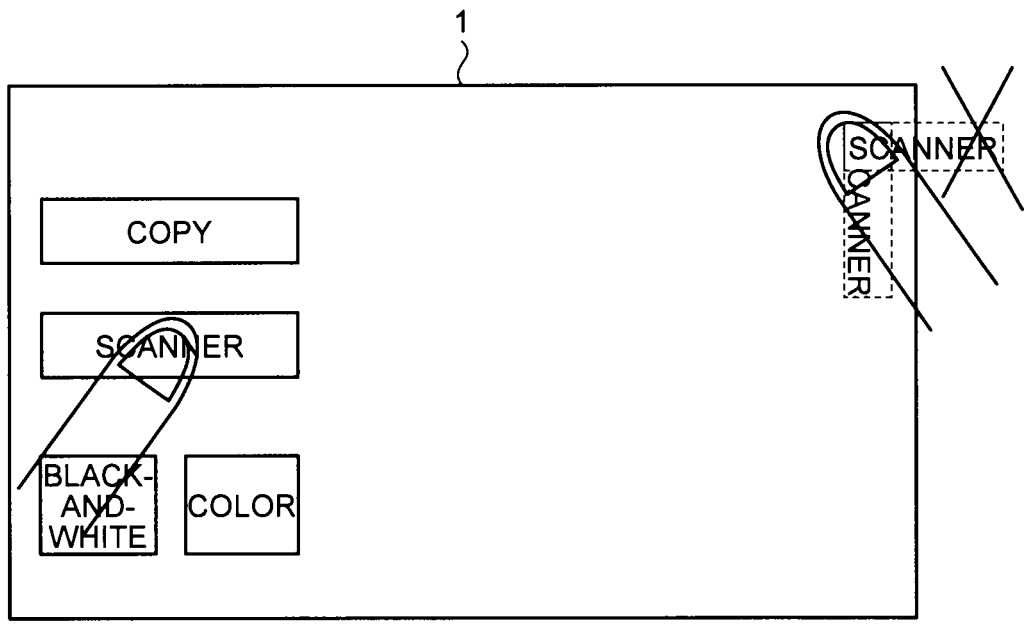
FIG. 7 is a diagram that illustrates an example where, if the feedback character string does not fit within the area on the right side, the character string is output to the lower side.

For the above feedback output, the determining unit 11*a* (the CPU 11) sets priorities to the upward, downward, leftward, and rightward directions. For example, if the order of priority is set to the rightward, downward, leftward, and upward directions in this order, it is determined whether the characters can be output within the right-side area of the display panel 2, as illustrated in FIG. 7. If it is determined that the characters cannot be output within the area, the control unit 11*b* (the CPU 11) performs a feedback output of the feedback character string in the downward direction.

Figure 8:
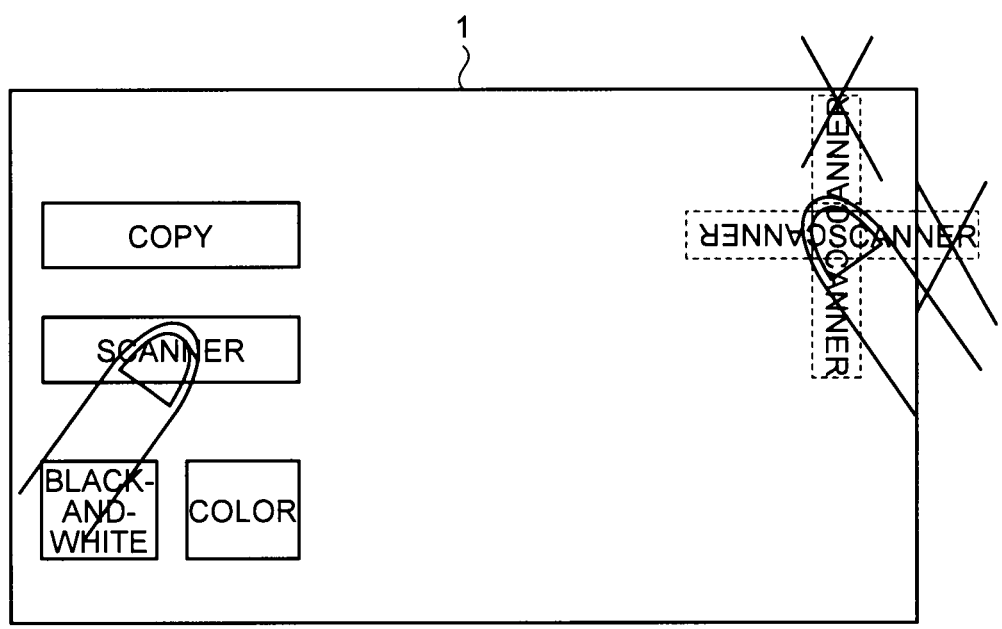
FIG. 8 is a diagram that illustrates an example where it is determined whether the feedback character string fits in the upward, downward, leftward, and rightward directions and the character string is then output in the direction in which it fits.

In this case, as illustrated in FIG. 8, the determining unit 11*a* (the CPU 11) determines whether the feedback characters can be output within the area of the display panel 2 in each of the upward, downward, leftward, and rightward directions. The control unit 11*b* (the CPU 11) prohibits the feedback output in a direction in which the characters cannot be output and performs the feedback output of the feedback character string in an appropriate direction or all of the directions out of the directions in which the character string can be output. In the case illustrated in FIG. 8, the control unit 11*b* (the CPU 11) prohibits the feedback in the upward and rightward directions because the character string does not fit within the area in those directions. The control unit 11*b* allows feedback in the downward and leftward directions because the character string fits within the area in those directions.

For the feedback output of the feedback character string, the control unit 11*b* (the CPU 11) allows the output of the feedback character string in not only the upward, downward, leftward, and rightward directions but also all the directions including oblique directions for 360 degrees.

Figure 9:
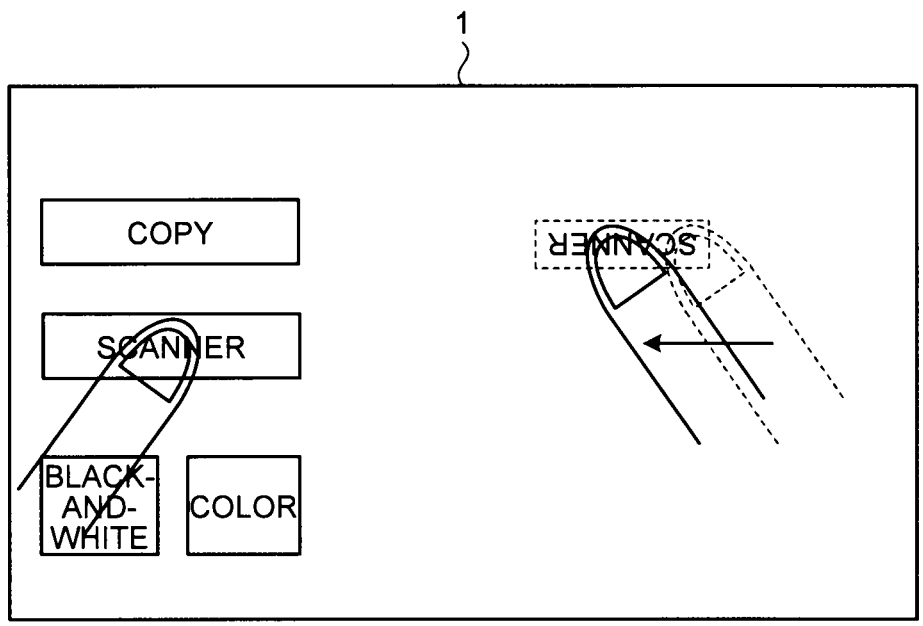
FIG. 9 is a diagram that illustrates an example where the feedback character string is sequentially output in the direction the finger moves.
Figure 10:
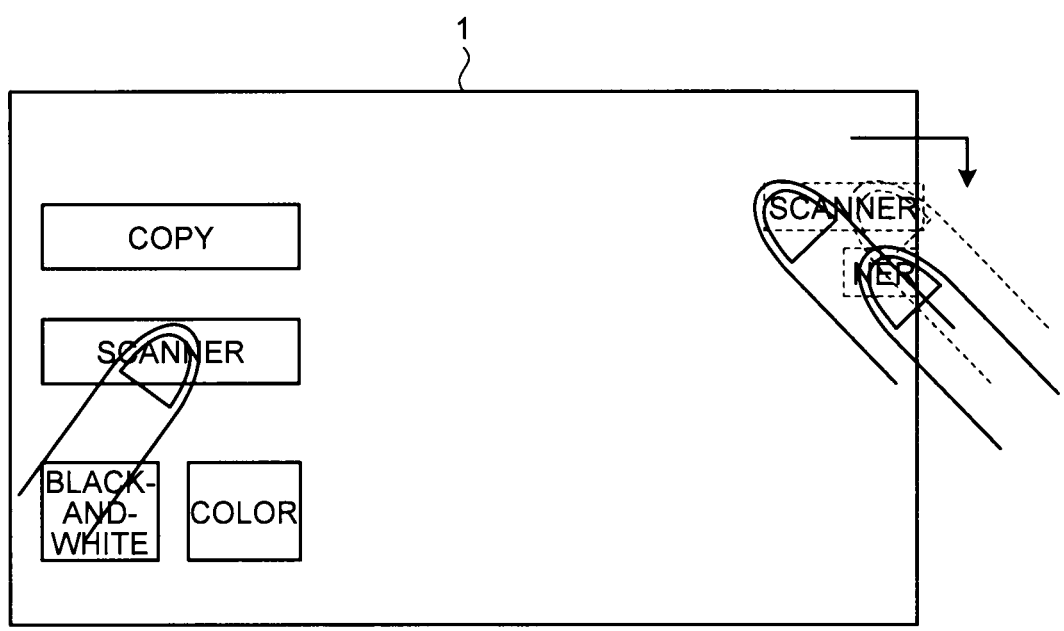
FIG. 10 is a diagram that illustrates an example of an output character string where the feedback character string does not fit when the character string is to be output in the direction the finger moves and, therefore, the finger moves to the lower side.

For the feedback output of the feedback character string, as illustrated in FIG. 9, the control unit 11*b* (the CPU 11) may detect a direction in which the finger moves from the location on the touch panel 4 touched by a finger, and may sequentially perform the feedback output of the feedback character string in the direction the finger moves. In FIG. 9, the arrow indicates the direction the finger moves. If the entire feedback character string cannot be output within the display area on the touch panel 4, the control unit 11*b* (the CPU 11) performs the feedback output of the feedback character string in accordance with the movement of the finger in the upward or downward direction, or the like, as illustrated in FIG. 10.

Figure 11:
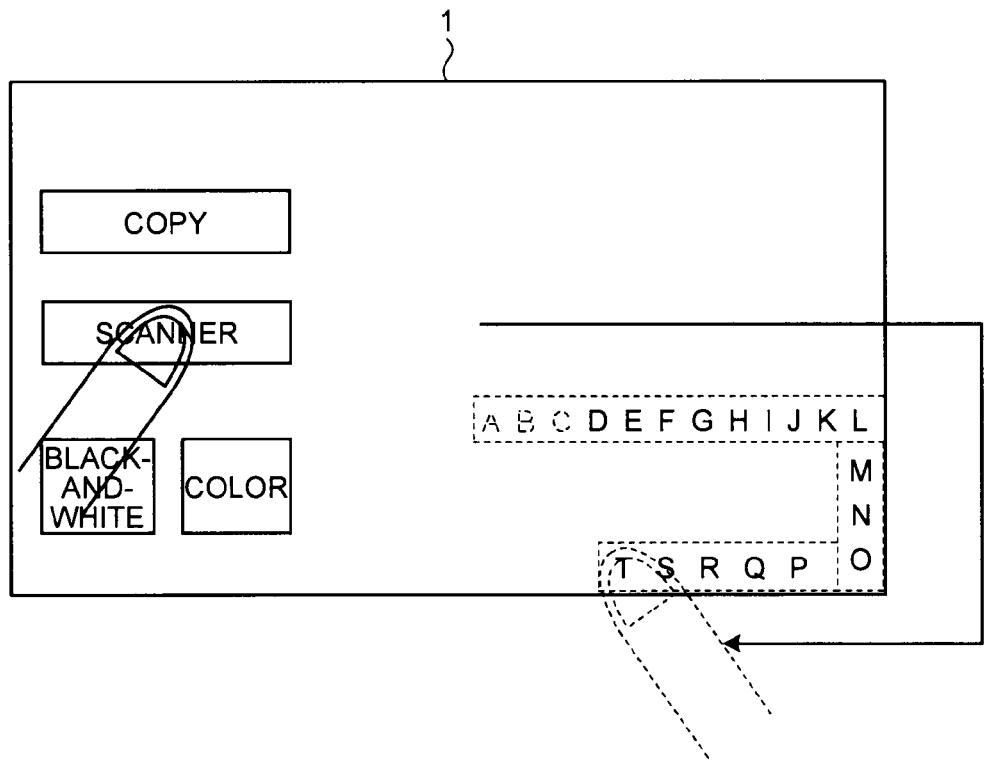
FIG. 11 is a diagram that illustrates an example where the output feedback characters are deleted in sequence.

When the feedback character string is output in accordance with the movement of the finger, the control unit 11*b* (the CPU 11) may delete the output feedback character string in accordance with a predetermined deletion condition, as illustrated in FIG. 11. For instance, the maximum number of output characters is set to, e.g., 10 characters as a deletion condition, and if the number of output characters exceeds 10 characters, the characters are deleted, starting from the initially output character. Moreover, the output time is set to, for example, 5 seconds, and the characters are sequentially deleted, starting from the character for which the output time has elapsed after it is output. In FIG. 11, the arrow indicates the direction the finger moves.

In the above case, in order that the user read the previously output feedback character string (Braille, or the like), the control unit 11*b* (the CPU 11) may output the deleted feedback character again. For example, the user performs such an operation that a finger traces the output feedback character string (Braille, or the like) in a backward direction, and at a timing when the finger reaches at the location from which the feedback character is deleted, the deleted feedback character is output again.

Figure 12:
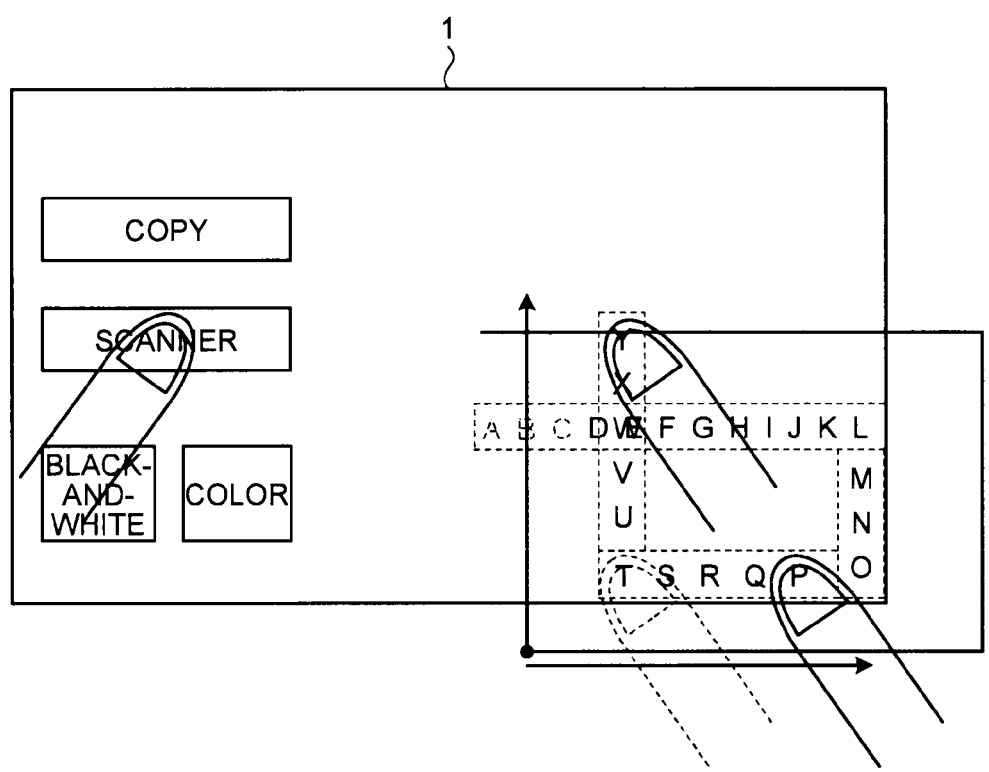
FIG. 12 is a diagram that illustrates an example of an output feedback character string when the direction the finger moves overlaps with the output characters.

In the case where the feedback character string is output in accordance with the movement of the finger, as illustrated in FIG. 12, when the output feedback character is overlapped with other feedback character due to a change in the direction the finger moves, the control unit 11*b* (the CPU 11) may delete the overlapped output feedback characters and may output a feedback character that needs to be output at the location according to the output order. In this case, the user may perform such an operation that a finger traces the output feedback character string in a backward direction, and at the timing when the finger reaches at the location from which the feedback character is deleted, the deleted feedback character may be output again. In FIG. 12, the arrow indicates the direction the finger moves.

Figure 13:
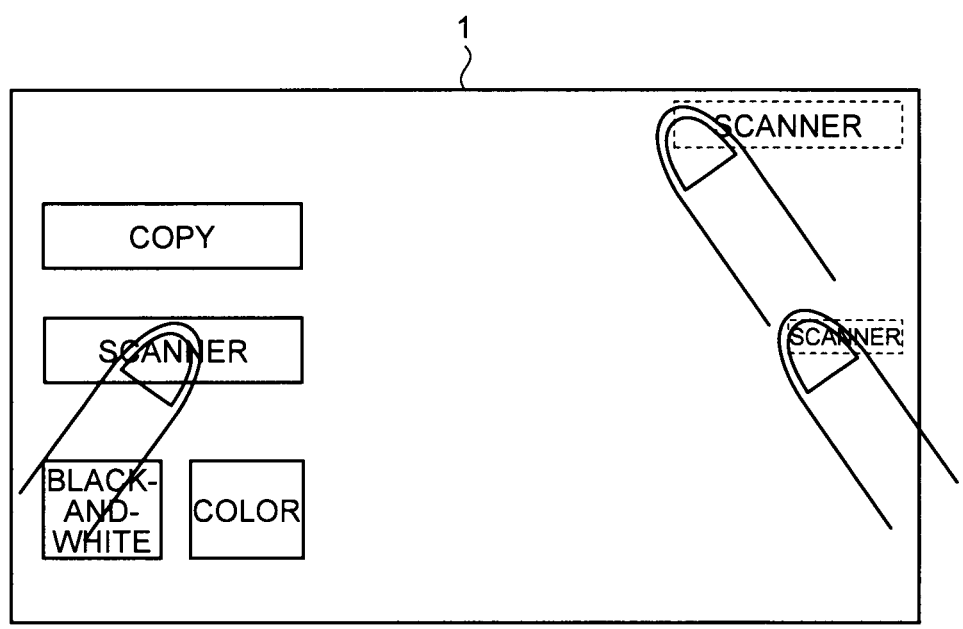
FIG. 13 is a diagram that illustrates an example where the feedback character string is output with the size of the characters changed in accordance with the allowable display area and the number of characters to be output.

In the case where the feedback character string is output in accordance with the movement of the finger, as illustrated in FIG. 13, the control unit 11b (the CPU 11) may change the size of a character to be output in accordance with the size of a space area on the display panel 2 in the direction the finger moves and in accordance with the number of characters of the feedback character string to be output. As illustrated in FIG. 13, because there is a large space area on the right side toward which the finger moves, "SCANNER" in large characters, which are located on the upper side, is output in accordance with the size of the space area. Because there is a small space area on the right side toward which the finger moves, "SCANNER" in small characters, which are located on the lower side, is output in accordance with the size of the space area.

As described above, in the user interface device 1 according to the embodiment, the touch panel 4 and the touch-panel controller 17 detect an operation performed in contact with or close to the surface of the touch panel 4, where the touch panel 4 displays, at appropriate locations, various types of display information and the function buttons to which functions are allotted. In order to output predetermined feedback, which is associated with the acquired operation location, in response to the operation performed on the display panel 2, it is determined whether the operation location is the display location of the function button displayed on the display panel 2. If the operation location is the display location of the function button, the control unit 11b (the CPU 11) causes the feedback panel 3 and the feedback controller 16 to output predetermined feedback, which is associated with the function button.

Therefore, visually impaired people can correctly and easily recognize the locations and functions of the function buttons without being constrained by the display locations of the function buttons on the display panel 2. As a result, the convenience for users can be improved.

In the user interface device 1 according to the embodiment, if multiple operation locations are detected as the operation location by the touch panel 4 and the touch-panel controller 17 and if at least one of the operation locations is the display location of a function button on the display panel 2, the control unit 11b (the CPU 11) causes the feedback, which allows the user to perceive that the operation location corresponds to a function button, to be output at the operation location, and causes the feedback, which allows the user to perceive information indicating the details of the function of the function button, to be output to another operation location.

Thus, if a multi-touch operation is performed on the location of a function button and a location other than the location of the function button, feedback is generated at the touched location corresponding to the location of the function button to notify the user that the touched location is the location of the function button, and feedback is generated at the touched location corresponding to the location other than the function button to notify the user of information indicating the details of the function of the function button. Thus, visually impaired people can more correctly and easily recognize the locations and functions of the function buttons without being constrained by the display locations of the function buttons on the display panel 2. As a result, the convenience for users can be improved.

Furthermore, in the user interface device 1 according to the embodiment, if multiple operation locations are detected by the touch panel 4 and the touch-panel controller 17 as the operation location and if all of the operation locations are the display locations of the function buttons on the display panel 2, the control unit 11b (the CPU 11) causes the feedback controller 16 and the feedback panel 3 to output, at the initially operated operation location out of the operation locations, the feedback that allows the user to perceive that the operation location corresponds to the function button, and to output, at another operation location, the feedback that allow the user to perceive information indicating the details of the function of the function button.

If the location of a function button on the touch panel 4 is being touched by one finger while any location is being touched by a different finger, the details of the function of the initially touched function button can be fed back to the different finger even though the location touched by the different finger corresponds to a different function button. The details of the function of the initially touched function button is fed back when a different location on the touch panel 4 is touched, and there is no need to search for an area other than those of the function buttons. Thus, the usability can be improved, and the recognition of the locations and functions of the function buttons can be correct and easy. As a result, the convenience for users can be improved.

In the user interface device 1 according to the embodiment, the feedback panel 3 and the feedback controller 16 output symbols and characters, such as Braille, as feedback.

Thus, it is possible to feedback information as to whether something is a function button or to feedback the details of the function of a function button by using Braille, or the like, with which a color vision defective is often familiar. Thus, the usability can be further improved.

In the user interface device 1 according to the embodiment, the CPU 11 causes the feedback panel 3 and the feedback controller 16 to output, as information that indicates the details of the function of a function button, a symbol and character string, such as Braille, that represents the details of the function. The symbol and character string is output in any direction, starting from the operation location. If there is no space on the display panel onto which the entire symbol and character string can be output in a first direction, the CPU 11 causes the feedback panel 3 and the feedback controller 16 to change an output direction from the first direction to a second direction in which the entire symbol and character string can be output and then to output the changed symbol and character string.

Thus, it is possible to correctly output the entire symbol and character string, which represents the details of the function of the function button, without any disconnection in the middle of the symbol and character string. Thus, the locations and functions of the function buttons can be recognized more correctly and reliably. As a result, the convenience for users can be improved.

In the user interface device 1 according to the present embodiment, when the touch panel 4 and the touch-panel controller 17 detect any movement in any direction of the operation location, at which the symbol and character string, such as Braille, is output to represent the details of the function of a function button, the control unit 11b (the CPU 11) causes the feedback panel 3 and the feedback controller 16 to sequentially output symbols and characters constituting the symbol and character string in the direction the operation location moves.

Even if there is no space on the touch panel 4 onto which the entire symbol and character string can be output, such as Braille, the characters can be sequentially output in the direction the finger moves. Thus, the locations and functions of the function buttons can be recognized more correctly and reliably. As a result, the convenience for users can be improved.

In the user interface device 1 according to the embodiment, the control unit 11b (the CPU 11) causes the feedback panel 3 and the feedback controller 16 to delete the symbol and character string, such as Braille, which have been sequentially output in accordance with the movement of the operation location, according to a predetermined deletion condition.

Thus, it is possible to prevent a problem in that, if a user continues to move a finger to read through the output symbol and character string, such as Braille, that has a large number of characters, space is lost due to the output symbols and characters. Thus, the usability can be improved, and the locations and functions of the function buttons can be recognized more correctly and reliably. As a result, the convenience for users can be improved.

In the user interface device 1 according to the embodiment, the control unit 11b (the CPU 11) causes the output symbol and character string to be deleted by using, as a deletion condition, the total number of output characters in the symbol and character string, the elapsed time after the symbol and character string is output, and overlapping with other output symbol and character strings on the operation location.

Thus, unnecessary symbol and character strings can be deleted, and the locations and functions of the function buttons can be recognized correctly and at low cost. As a result, the convenience for users can be improved.

In the user interface device 1 according to the embodiment, when the operation location moves in a backward direction over the symbol and character string, which has been output in accordance with the movement of the operation location, and reaches at the location from which the symbol and character string has been already deleted, the control unit 11b (the CPU 11) causes the feedback panel 3 and the feedback controller 16 to output the deleted symbol and character string again onto that operation location.

If the symbol and character string are deleted once, the symbol and character string desired by the user can be correctly output. Thus, the locations and functions of the function buttons can be recognized more correctly and reliably. As a result, the convenience for users can be improved.

In the user interface device 1 according to the present embodiment, the control unit 11b (the CPU 11) causes the size of a symbol and character string to be changed in accordance with the size of the space for the symbol and character string in its output direction, where the space starts from the operation location at which the symbol and character string start to be output, and to output the changed symbol and character string.

Therefore, the size of the symbol and character string can be changed in accordance with the length of the symbol and character string to be output and the space for the output. Thus, the locations and functions of the function buttons can be recognized more correctly and reliably. As a result, the convenience for users can be improved.

According to the embodiment, visually impaired people can correctly and easily recognize the locations and functions of the function buttons without being constrained by the display locations of the function buttons and, as a result, the convenience for users can be improved.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A user interface device comprising: a display panel; a display-panel control unit that displays, at appropriate locations on the display panel, various types of display information and function buttons to which functions are allotted;

an operation-location detecting unit that detects a user's operation performed in contact with or close to a surface of the display panel so as to acquire an operation location;

a feedback output unit that outputs tactile feedback to a user;

a determining unit that determines whether the operation location is a display location of a function button displayed on the display panel; and a control unit that, when the determining unit determines that the operation location is the display location of the function button, controls the feedback output unit to output a predetermined feedback that is associated with the function button, wherein when the operation-location detecting unit detects multiple operation locations, the determining unit determines whether a first operation location of the operation locations is the display location of the function button, and when the determining unit determines that the first operation location is the display location of the function button, the control unit controls the feedback output unit to output, at the first operation location, a first tactile feedback that indicates to the user that the first operation location corresponds to the function button and, at a second operation location of the multiple operation locations, a second tactile feedback that provides the user with information in Braille that describes the function of the function button; and the control unit controls the feedback output unit to output the second tactile feedback that provides the user with a symbol and character string in Braille that describes the function of the function button and the symbol and character string being are output in a first direction, starting from the operation location, the determining unit determines whether a space on the display panel, beginning from the operation location in the first direction, is large enough for the output of the entire symbol and character string of the second tactile feedback, and when the determining unit determines that the space is not large enough, the control unit controls the feedback output unit to output the symbol and character string of the second tactile feedback in a second direction different from the first direction, beginning from the operation location, such that the entire symbol and character string of the second tactile feedback is output.

2. The user interface device according to claim 1, wherein the determining unit determines whether each of the operation locations corresponds with a display location of one of the function buttons, and when the determining unit determines that each of the operation locations corresponds with the display location of one of the function buttons, the control unit controls the feedback output unit to output, at an initially operated operation location, a tactile feedback that provides the user with information that the function button corresponds with the initially operated operation location.

3. The user interface device according to claim 2, wherein the control unit changes a size of a symbol and character string provided in the second tactile feedback depending on a size of a space that starts from the operation location at which the symbol and character string start to be output and that extends in an output direction of the symbol and character string, and then outputs the symbol and character string.

4. The user interface device according to claim 1, wherein when the operation-location detecting unit detects movement in any direction of the operation location at which the second tactile feedback is output, the control unit controls the feedback output unit to sequentially output the symbol and character string in accordance with the movement of the operation location.

5. The user interface device according to claim 4, wherein the control unit controls the feedback output unit to delete any symbol and character string provided to the user in Braille within the second tactile feedback according to movement of the operation location and a predetermined deletion condition.

6. The user interface device according to claim 5, wherein the predetermined deletion condition includes a total number of output characters in the symbol and character string, an elapsed time after the symbol and character string is output, or overlapping with other output symbol and character strings on the operation location.

7. The user interface device according to claim 5, wherein when the operation location moves in a backward direction over the symbol and character string provided to the user in Braille within the second tactile feedback according to the movement of the operation location and reaches at the location from which the symbol and character string is deleted, the control unit controls the feedback output unit to output the second tactile feedback including the deleted symbol and character string onto the operation location.

8. The user interface device according to claim 1, wherein the feedback output unit outputs, as the first tactile feedback, a tactile sensation such that the user feels as if the user is pressing the function button.

9. An image forming apparatus comprising the user interface device according to claim 1, wherein
the image forming apparatus forms an image and outputs the image to a recording medium in response to an input operation performed by using the user interface device.

10. A user interface control method comprising:
displaying, at appropriate locations on a display panel, various types of display information and function buttons to which functions are allotted;
detecting, via an operation-locating detecting unit, an operation performed in contact with or close to a surface of the display panel so as to acquire an operation location;
determining, via a determining unit, whether the operation location is a display location of a function button displayed on the display panel;
outputting, via a control unit, when the operation location is the display location of the function button, a predetermined feedback, via a feedback output unit, that is associated with the function button at the outputting;
determining, when the operation-location detecting unit detects multiple operation locations, whether a first operation location of the operation locations is the display location of the function button;
outputting at the first operation location, when the first operation location of the multiple operation locations is the display location of the function button, a first tactile feedback that indicates to the user that the first operation location corresponds to the function button; and
outputting at a second operation location of the multiple operation locations, when the first operation location of the multiple operation locations is the display location of the function button, a second tactile feedback that provides the user with information in Braille that describes the function of the function button; and
the control unit controls the feedback output unit to output the second tactile feedback that provides the user with a symbol and character string in Braille that describes the function of the function button and the symbol and character string being are output in a first direction, starting from the operation location,
the determining unit determines whether a space on the display panel, beginning from the operation location in the first direction, is large enough for the output of the entire symbol and character string of the second tactile feedback, and
when the determining unit determines that the space is not large enough, the control unit controls the feedback output unit to output the symbol and character string of the second tactile feedback in a second direction different from the first direction, beginning from the operation location, such that the entire symbol and character string of the second tactile feedback is output.

11. A non-transitory computer-readable medium including computer-readable program codes embodied in the medium that when executed by a computer, cause the computer to execute a method comprising:
displaying, at appropriate locations on a display panel, various types of display information and function buttons to which functions are allotted;
detecting, via an operation-locating detecting unit, an operation performed in contact with or close to a surface of the display panel so as to acquire an operation location;
determining, via a determining unit, whether the operation location is a display location of a function button displayed on the display panel;
outputting, via a control unit, when the operation location is the display location of the function button, a predetermined feedback, via a feedback output unit, that is associated with the function button at the outputting;
determining, when the operation-location detecting unit detects multiple operation locations, whether a first operation location of the operation locations is the display location of the function button;
outputting at the first operation location, when the first operation location of the multiple operation locations is the display location of the function button, a first tactile feedback that indicates to the user that the first operation location corresponds to the function button; and
outputting at a second operation location of the multiple operation locations, when the first operation location of the multiple operation locations is the display location of the function button, a second tactile feedback that provides the user with information in Braille that describes the function of the function button; and
the control unit controls the feedback output unit to output the second tactile feedback that provides the user with a symbol and character string in Braille that describes the function of the function button and the symbol and character string being are output in a first direction, starting from the operation location, the determining unit determines whether a space on the display panel, beginning from the operation location in the first direction, is large enough for the output of the entire symbol and character string of the second tactile feedback, and when the determining unit determines that the space is not large enough, the control unit controls the feedback output unit to output the symbol and character string of the second tactile feedback in a second direction different from the first direction, beginning from the operation location, such that the entire symbol and character string of the second tactile feedback is output.

* * * * *